Feb. 6, 1968   M. A. LACE   3,368,042
TIMING DEVICE DRIVEN BY A BIDIRECTIONAL MOTOR
Filed May 25, 1965   3 Sheets-Sheet 1

INVENTOR
Melvin A. Lace
By Hofgren, Wegner, Allen, Stellman & McCord
ATTORNEYS

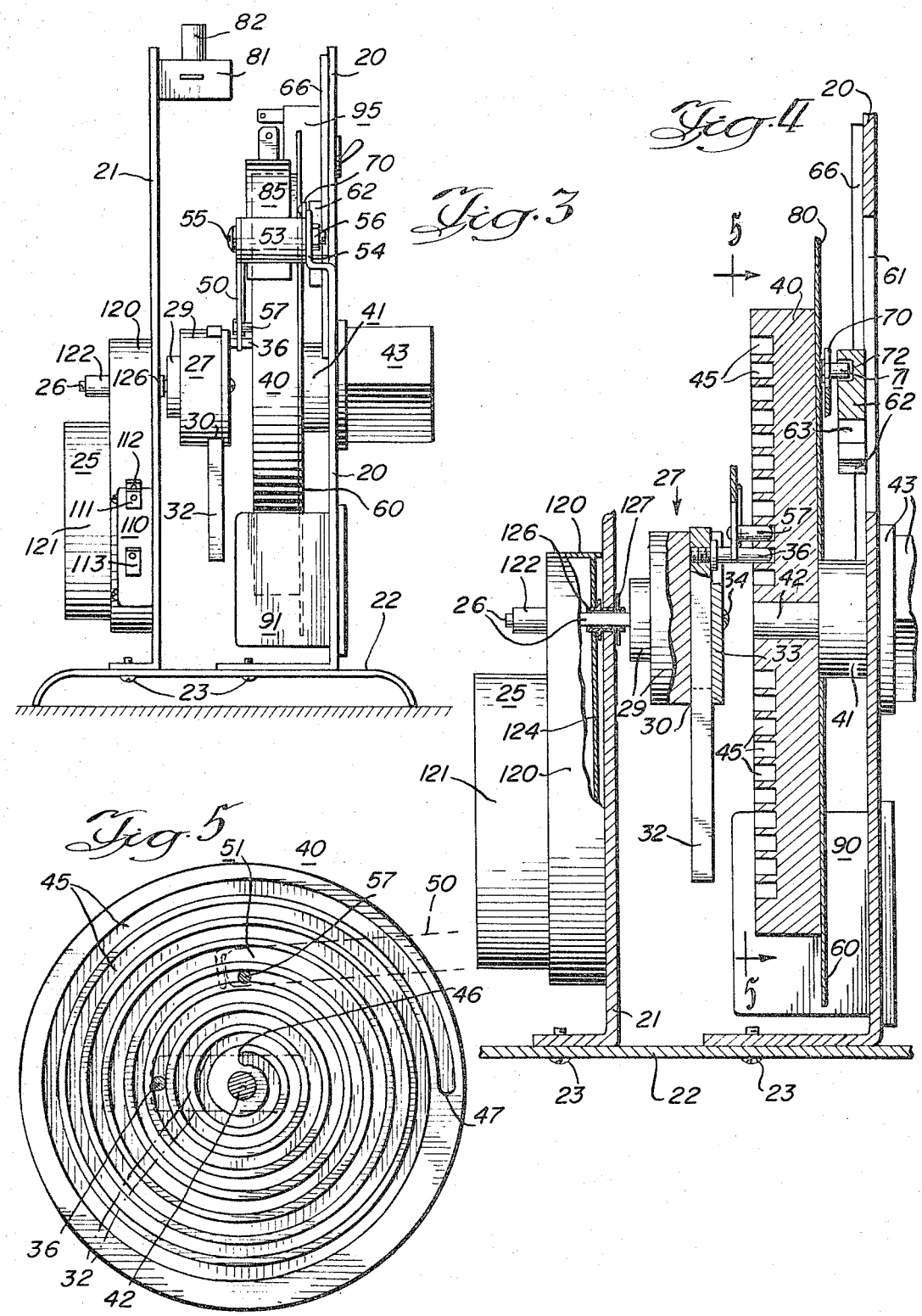

Feb. 6, 1968
M. A. LACE
3,368,042
TIMING DEVICE DRIVEN BY A BIDIRECTIONAL MOTOR
Filed May 25, 1965
3 Sheets-Sheet 3
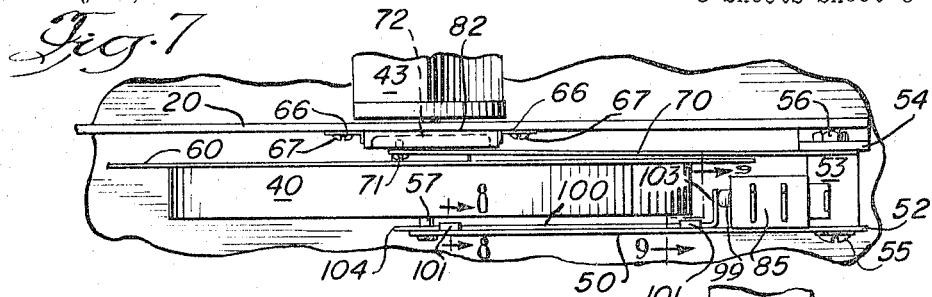
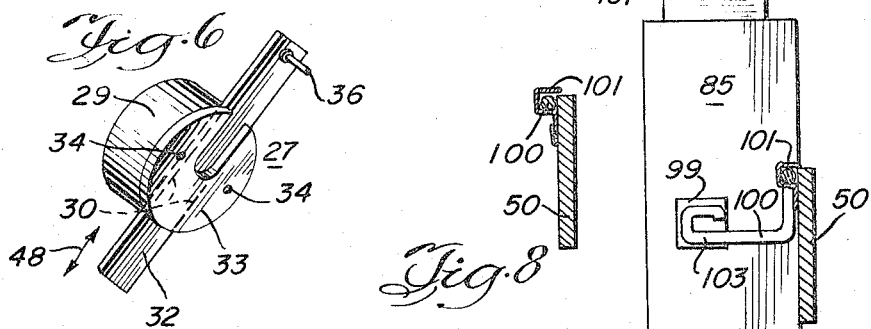
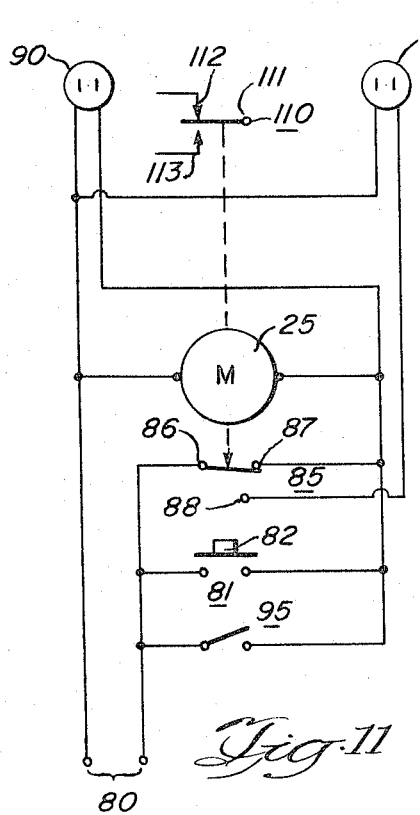
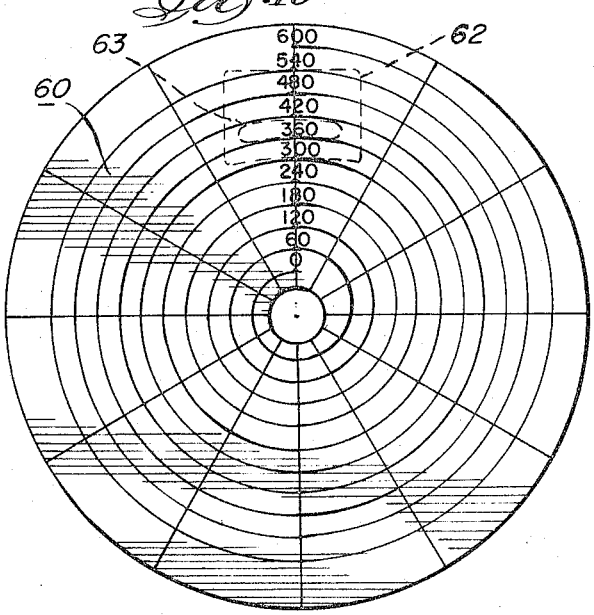

United States Patent Office 3,368,042
Patented Feb. 6, 1968

3,368,042
TIMING DEVICE DRIVEN BY A
BIDIRECTIONAL MOTOR
Melvin A. Lace, Prospect Heights, Ill., assignor to Oak
Electro/Netics Corp., a corporation of Delaware
Filed May 25, 1965, Ser. No. 458,643
20 Claims. (Cl. 200—38)

ABSTRACT OF THE DISCLOSURE

A bidirectional timer motor rotates a slide assembly, having a pin captured in a spiral channel, between stops located along the spiral channel, causing the motor to reverse its direction of rotation and reciprocate the slide assembly along the spiral path. A switch, opened when the slide assembly is rotated against a stop, may be connected to de-energize the motor after a single cycle of reciprocation. As the slide assembly strikes the stops, the motor unit itself slides over a surface to actuate another switch.

This invention relates to a timing device, and more particularly to a timer adjustable to provide a wide range of time periods.

Prior timing devices have utilized a bidirectional self-starting motor which, when constrained from rotation in one direction, rotates in the opposie direction. This motor rotates a member through a circular path into engagement with abutment means, which prevent further rotation in the one direction and cause the motor to begin rotation in the reverse direction. This member may have a cam surface thereon which actuates a switch during a certain portion of time during each period of reciprocation of the rotation member, defined as the duty cycle. The period is equal to the time necessary for the member to rotate in one direction, and then in the opposite direction back to its point of origin. Such a device is suitable when the period of operation of the switch is no greater than the time of one cycle of rotation of the rotating member. When a longer time period must be provided, prior timers have utilized additional members rotated in accordance with the rotation of the member.

For many applications, it is desirable to provide a timer which is adjustable over a substantial range of time periods. One solution to this problem is to provide a drive mechanism between the motor and the rotating member having an adjustable gear ratio. However, in order to provide a substantial range of time periods, such a structure is unnecessarily complex and further becomes increasingly inaccurate as the range of periods to be provided increases. In order to overcome the disadvantages of drive systems employing adjustable gear ratios, a ratchet wheel type arrangement, incrementally driven once during each period of the reciprocating member, has been proposed.

In accordance with the present invention, an adjustable timer having a maximum period of operation greater than the time of one cycle of rotation is constructed without the addition of any members rotated by the rotation of the motor driven member.

A principal object of this invention is to provide an improved timing device having a period of operation adjustable over a substantial range.

Another object of this invention is to provide a timing device having an improved construction for actuating a switch.

One feature of this invention is the provision of a timing device utilizing a bidirectional self-starting motor for rotating a member between stop surfaces. The period of reciprocation of the member between the stop surfaces may be adjusted to different values substantially longer than the time of one cycle of rotation of the member.

Another feature of this invention is the provision of a timing device which causes a member to travel through a noncircular path of rotation having an adjustable stop movable along the path for providing an adjustable period of operation.

Yet another feature of this invention is the provision of a timing device in which a rotating member follows a spiral path of motion which allows the period of reciprocation of the member to be longer than the time necessary for 360° rotation of the member. The reciprocating member is used to actuate a switch having a period identical to the period of the reciprocating member.

Still a further feature of this invention is the provision of a simple and economic timing device using a motor unit having a rotating shaft. The motor unit itself rotates during a portion of the period of reciprocation of a member driven by the rotating shaft. The movement of the motor is used to actuate a switch.

Further features and advantages of the invention will become apparent from the following specification and from the drawings, in which:

FIGURE 3 is a side view of the apparatus, from the left of FIGURE 1;

FIGURE 4 is a sectional view taken along line 4—4 of FIGURE 2;

FIGURE 5 is a view taken along line 5—5 of FIGURE 4 of the disc having a spiral channel therein;

FIGURE 6 is a perspective view of the slide and holder assembly;

FIGURE 7 is a fragmentary plan view of the disc and associated parts;

FIGURE 8 is a sectional view of the stop arm and switch actuating rod, taken along line 8—8 of FIGURE 7;

FIGURE 9 is an enlarged view of the actuating rod and electrical switch assembly, taken along line 9—9 of FIGURE 7;

FIGURE 10 is a front view of the time index wheel; and

FIGURE 11 is a schematic diagram of the circuit of the invention.

Figure 1:
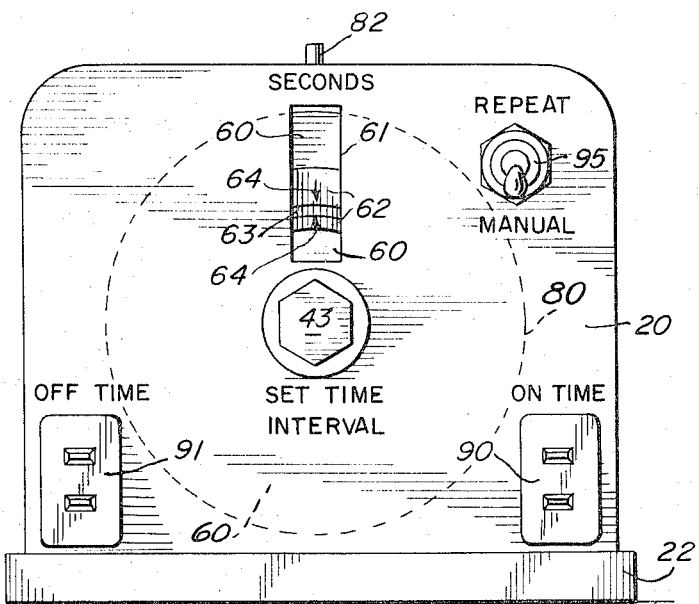
FIGURE 1 is a front view of an apparatus embodying the invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Turning now to the drawings, the timing device is mounted on a base structure including a front vertical plate 20 and a back vertical plate 21, each secured to a bottom plate 22 by screws 23 (FIGURE 3).

A bidirectional self-starting synchronous motor 25, pivotally mounted on plate 21, as will appear, rotates a shaft 26 which extends through back plate 21 and carries a slide assembly 27. The bidirectional motor when constrained from rotation in one direction, will rotate in the opposite direction. Through a suitable gear arrangement, shaft 26 is rotated by the motor at any desired speed, e.g., one r.p.m. Such a suitable motor is fully disclosed in a co-pending application of Melvin A. Lace, "Motor," Ser. No. 411,986, filed Nov. 18, 1964, and assigned to the assignee of this invention.

The slide assembly 27, FIGURES 4 and 6, is composed of a cylindrical holder 29, concentric with shaft 26, and having a rectangular channel 30 on one face of the holder. A slide 32 having a rectangular cross-section is held within channel 30 by a retainer plate 33 affixed to the face of holder 29 by screws 34. A tracking pin 36 is mounted on one end of slider 32 and extends parallel with the shaft.

A timing disc 40 is spaced from front plate 20 by a bushing 41 and is fixedly mounted on a shaft 42 (FIGURE 4) which extends through the bushing and an opening in front plate 20 and has a knob 43 thereon. Disc 40 has a spiral channel 45 of rectangular cross-section (FIGURES 2, 4 and 5) formed in the rear face, adjacent slide assembly 27. Channel 45 has inner and outer closed end surfaces 46 and 47.

Figure 2:
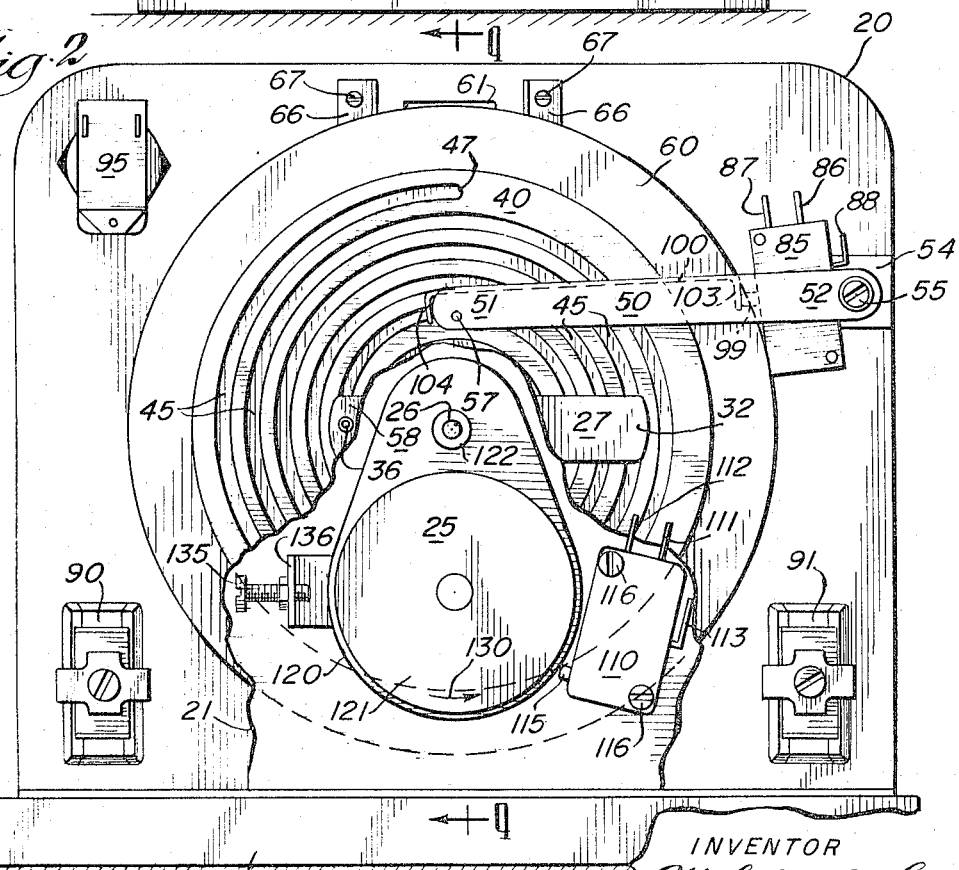
FIGURE 2 is a view from the left of FIGURE 3 with a portion of the rear base plate removed.

Tracking pin 36 extends into the spiral channel 45. As motor 25 rotates shaft 26 and slide assembly 27, pin 36 moves inwardly or outwardly along the spiral, depending on the direction of motor rotation. This movement is possible because assembly 27 allows pin 36 to freely move in a radial direction, seen by the arrow 48 in FIGURE 6, while holder 29 is rotated by the motor. Assuming slide assembly 27 rotates counterclockwise (as seen in FIGURE 2) pin 36 moves inwardly until it reaches the end of channel 45 and strikes surface 46. As shaft 26 of motor 25 is constrained from further rotation, the motor reverses its direction of rotation, driving pin 36 in a clockwise direction, and hence outward along the spiral channel 45.

A stop arm 50, FIGURES 2 and 5, has an end 51 positioned to be engaged by pin 36 at it moves outwardly. The other end 52 of stop arm 50 is fixedly mounted by a key to spacer sleeve 53. The arm 50 and sleeve 53 are pivotally mounted on an offset tab 54 by a screw 55 threaded on a nut 56.

End 51 of stop arm has a pin 57 thereon extending into the spiral channel 45 of disc 40. As a result, end 51 is captured by the spiral channel. As disc 40 is rotated by knob 43, pin or stop 57 is urged in an arcuate path around the pivot of arm 50. Thus, pin 57 is moved upward if disc 40 is rotated clockwise, and downward if disc 40 is rotated counterclockwise (as viewed in FIGURE 2).

The engagement of pin 36 with end 51 of arm 50 causes the motor 25 to stop rotation in the clockwise direction and begin rotation in the counterclockwise direction. Pin 36 now rotates back to end 46 transversely located relative to stop 57 and again reciprocates. By rotating disc 40 and moving end 51 of stop arm 50 to new locations along channel 45, the total length of the path that pin 36 follows is varied, thereby varying the period of reciprocation of the motor.

Pin 57 of stop arm 50 may be moved by rotation of knob 43 to a position located a short distance from surface 46, causing a period of reciprocation which is less than the time of one cycle of rotation of shaft 26. Conversely, pin 56 may be moved to a position located very close to surface 47, causing a period of reciprocation which is substantially longer than the time of one cycle of rotation of shaft 26. With the construction illustrated, the novel timing device products periodically recurring motion, as for actuating a switch. By the rotation of a single member, viz. knob 43, the total period of reciprocation may be adjusted from very short to extremely long, as compared with the time interval for one cycle of rotation of shaft 26 and slide assembly 27.

The period of time for one reciprocation of motor 25 or members rotated thereby, as arm 32, is defined as the time necessary to rotate in one direction, and then in the opposite direction back to the original starting position. Shaft 26 may rotate through many complete revolutions first in one direction, and then in the reverse direction, during a single period of reciprocation of the timer.

The timing disc 40 preferably has indicia associated therewith for indicating the total period of reciprocation that has been selected by rotation of knob 43. For this purpose, an index wheel 60 is affixed to one face of timing disc 40. Index wheel 80 has indicia displayed thereon, which for one embodiment of the invention are shown in FIGURE 10. The numerals indicate the total period of operation of the timer, and are located in a path that spirals from the center of wheel 60 outwardly toward the periphery. The period of operation of the timer illustrated is continuously variable, with a maximum time of 600 seconds, and may be set with a high degree of accuracy, depending on the graduations used.

A rectangular opening 61, best seen in FIGURE 1, is provided in front plate 20 for viewing a portion of index wheel 60. A window member 62 is vertically movable in opening 61, and has an opening 63 through which the indicia on wheel 60 may be viewed. An index mark 64 on window member 62 points to the exact period of time selected by rotation of knob 43.

Window 62 is slidably mounted between two brackets 66, FIGURES 2 and 7, of L-shaped cross-section, which are affixed to front plate 20 by screws 67. Window member 62 is held at the end of an index arm 70 by a screw 71 (see FIGURES 4 and 7) which is inserted through the arm into a longitudinal slot 72 in window 62. The other end of index arm 70 is connected with stop arm 50 through spacer sleeve 53 which is locked by a key to index arm 70.

As knob 43 is rotated, the spiral channel in disc 40 moves stop arm 50 and attached spacer 53 about screw 55. Since index arm 70 is also secured to spacer 53, it will similarly rotate, causing the window 62 to move vertically up or down in the channel formed by brackets 66.

For many applications, it is desirable that the timing device complete one period of operation, as selected by knob 43, and thereafter be deenergized until reset by the user. For this purpose, motor 25 is wired according to the schematic diagram illustrated in FIGURE 11. A suitable source, as 120 volts AC, is connected to terminals 80. A start switch 81, actuated when a push button 82 is depressed, is coupled from one side of the AC source to motor 25.

An interval switch 85 normally maintains a contact 86 in engagement with a contact 87, energizing motor 25. Interval switch 85 is actuated at the end of a period of reciprocation of motor 25, when pin 36 engages end 51 of stop arm 50, as will be apparent. At this time, contact 86 is moved out of engagement with contact 87 and into engagement with contact 88. As a result, motor 25 is deenergized, and pin 36 remains engaged with stop end 51.

When it is desired to start the timer for another cycle of reciprocation, button 82 of switch 81 is depressed, energizing motor 25. Pin 36 will begin to move counterclockwise and out of engagement with stop arm 50, as previously explained, thereby deactuating interval switch 85, closing contacts 86 and 87 and completing a holding circuit for motor 25. Pin 36 will spiral inward, strike surface 46, and then spiral outward until it again moves into engagement with stop arm 50, actuating interval switch 85. At this time, the motor will again become deenergized.

An electrical socket 90, coupled across motor 25, remains energized when the timer is "on." Conversely, a socket 91, coupled to electrical contact 88, is energized only when the timer is "off" and interval switch 85 actuated. The width of the "on" pulse at socket 90, or the width of the "off" pulse at socket 91, is varied by rotating knob 43, as heretofore described, thereby changing the period of reciprocation of the motor.

For some applications, it is desirable that the timing device continuously reciprocate, and generate a timing pulse each time one period of operation is complete. For this purpose, a repeat switch 95 is coupled in parallel with start switch 81. When it is desired to have the timer continue to reciprocate or "repeat," switch 95 is closed, bypassing switches 81 and 85 to couple motor 25 directly to the source. Each time one cycle of reciprocation is completed, switch 85 is actuated for a short time, as pin 36 moves into and out of engagement with stop arm 50. Thus, contact 86 is moved into engagement with contact 88, and a pulse appears at socket 91 during this short time interval. Since switch 85 is bypassed by repeat switch 95, the motor will continue to reciprocate and generate the short timing pulse each time one cycle is complete.

One embodiment for interval switch 85 is seen best in FIGURES 2 and 7. Switch 85 has a plunger 99 which when depressed maintains contact 86 against contact 88. A rod 100 is slidably held along stop arm 50 by bracket 101 attached thereto. One end 103 of rod 100 is formed into a loop, as seen in FIGURE 9, which abuts plunger 99 of switch 85. The other end 104 of rod 100 extends downwardly and in front of end 51 of stop arm 50 (FIGURE 2). When pin 36 is rotated into engagement with rod end 104, rod 100 will depress plunger 99. Electrical contacts 86 will be moved out of engagement with contact 87 and into engagement with contact 88, thereby deenergizing motor 25. As a result, arm 32 stops and pin 36 remains engaged with rod end 104. Start switch 81 is closed, as previously explained, to restart the timer.

An interval switch 110, illustrated in FIGURE 2, may be used in place of switch 85. Switch 110 has an electrical contact 111 movable between contacts 112 and 113. These contacts are connected as shown in FIGURE 11 for switch 85 when switch 110 is used in place of switch 85.

Returning to FIGURE 2, switch 110 has actuating means, in the form of a plunger 115, which when depressed moves contact 111 out of engagement with contact 112 and into engagement with contact 113. Switch 110 is attached to back plate 21 by screws 116 and is actuated by motor 25. Motor 25 is mounted on a housing 120 containing gears (not illustrated) which connect the rotor of motor 25 with shaft 26. A motor cover 121 is affixed to housing 120. Shaft 26 is rotatably mounted in a bearing 122, affixed to housing 120.

A bottom plate 124 (FIGURE 4) having an opening therein for shaft 26 is mounted to housing 120. The opening receives a bushing 126 which is rigidly mounted to the bottom plate. Bushing 126 extends through a circular opening in back plate 21 and is rotatably held therein by a "C" ring 127 snapped into a recessed portion of bushing 126. Thus, motor unit 25 and attached bushing 126 are rotatably mounted on back plate 21.

The shaft 26 extends through a central cylindrical opening in bushing 126 to the slide assembly 27 rotated thereby. As pin 36 on arm 32 is rotated clockwise into engagement with end 51 of stop arm 50, shaft 26 is constrained from rotation relative to back plate 21. It is immaterial to motor 25 whether shaft 26 rotates relative to housing 120, or housing 120 rotates in the opposite direction relative to a fixed shaft 26. Therefore, housing 120 rotates counterclockwise, as shown by the arrow 130 in FIGURE 2, and into engagement with plunger 115.

If repeat switch 95, seen in FIGURE 11, is open, the motor will be deenergized as switch 110 is actuated, in the same manner as previously described for switch 85. The rotor in motor 25 will assume a rest position in between the nearest adjacent stator poles. As a result, housing 120 will remain against plunger 115, causing switch 110 to remain actuated.

If repeat switch 95 is closed, motor 25 remains actuated, and shaft 26 rotates counterclockwise, moving pin 36 away from stop arm 50. Since the rotor of motor 25 is no longer held in a rest position, the force of the depressed plunger 115 against housing 120 causes the housing to rotate slightly about shaft 26, releasing plunger 115 and deactuating switch 110.

When pin 36 is rotated fully counterclockwise and engages surface 46 of channel 45, the opposite operation occurs. Housing 120 is rotated clockwise around the constrained shaft 26 and into engagement with a set screw 135 held by a flange 136. Shaft 26 is now constrained from further rotation relative to the housing, and thus motor 25 again reverses its direction of rotation. Housing 120 actuates switch 110 for a short interval of time during the total period of reciprocation of the motor.

Any device, whether mechanical or electrical, which can be actuated by a member moved by the timing device can be used in this invention. In place of or in addition to the switch constructions previously described, other mechanisms may be actuated by the movement of any portion of the timing device described. For example, in place of switch 110, a light source (not illustrated) may project a photobeam, through the area occupied by plunger 115, to a photocell. The movement of the housing 120 into the path of the actuating means, i.e., the light beam, would interrupt the flow of current to the photocell, thus actuating an electrical circuit connected thereto. Similarly, the movement of plunger 115 could be utilized in a purely mechanical device for moving a member in accordance with the motion of housing 120. For the purpose of this disclosure, a switch having an actuating means is defined to include any device which can utilize the movement of a portion of the timing device to produce a desired result.

I claim:

1. A timing device comprising: a bidirectional self-starting motor means which, when constrained from rotation in one direction, will rotate in the opposite direction; means having a member thereon, rotated about an axis by said motor; means causing said member to follow a non-circular path around said axis; means including first and second stop surfaces located along said path for constraining said member when said motor rotates said member thereagainst, causing said motor to reverse its direction of rotation, one of said stop surfaces being movably mounted, said member when rotated thereagainst moving said one stop to a new position; and actuating means associated with a switch and located at said new position for actuating said switch when engaged by said one stop.

2. A timing device, comprising: a bidirectional self-starting motor means which, when constrained from rotation in one direction, will rotate in the opposite direction; means having a member thereon, rotated about an axis by said motor; means causing said member to follow a non-circular path around said axis; means including first and second stop surfaces located transversely along said path for constraining said member when said motor rotates said member thereagainst, causing said motor to reverse its direction of rotation; and means for moving one of said transversely located stop surfaces along said path to vary the period of reciprocation of said member.

3. A timing device, comprising: a bidirectional self-starting motor means which, when constrained from rotation in one direction, will rotate in the opposite direction; a support on which said motor means is rotatably mounted; means having a member thereon, rotated about an axis by said motor; means causing said member to follow a non-circular path around said axis; means including first and second stop surfaces located along said path for constraining said member when said motor rotates said member thereagainst, causing said motor to reverse its direction of rotation, said motor means rotating to a new position when said member engages one of said stop surfaces; switch means actuated in response to the rotation of said motor means; and means for moving one of said stop surfaces along said path to vary the period of reciprocation of said member.

4. A timing device, comprising: a bidirectional self-starting motor means which, when constrained from rotation in one direction, will rotate in the opposite direction; a holder rotated about an axis by said motor; a slide with a member thereon mounted on said holder for movement in a radial direction; disc means having a spiral surface thereon capturing said member, causing said member to follow a spiral path about said axis; first stop means located along said path for engaging said member when rotated thereagainst, causing said motor to stop rotation in the one direction and begin rotation in the opposite direction; and second stop means captured by said spiral surface for engaging the member when rotated thereagainst, causing said motor to stop rotation in the other direction and begin rotation in the one direction.

5. The timing device of claim 4 wherein said second stop means is movable to different points along said spiral surface, thereby varying the period of reciprocation of said member.

6. A timing device, comprising: a bidirectional self-starting motor means which, when constrained from rotation in one direction, will rotate in the opposite direction; a holder rotated about an axis by said motor; a slide with a member thereon mounted on said holder for movement in a radial direction; base means for mounting said motor; disc means rotatably mounted on said base, having a spiral surface for capturing said member, causing said member to follow a spiral path about said axis; first stop means located along said path for engaging said member when rotated thereagainst, causing said motor to stop rotation in the one direction and begin rotation in the opposite direction; and second stop means including an arm movably mounted to said base, said arm having an end portion captured by said spiral surface for engaging the member when rotated thereagainst, causing said motor to stop rotation in the other direction and begin rotation in the one direction, the rotation of said disc relative to said base causing said end portion to move to different points along said spiral surface, thereby varying the period of reciprocation of said member.

7. The timing device of claim 6 wherein said arm of said second stop means is pivotally mounted to said base, causing said stop to follow an arcuate path about said pivot as said disc is rotated relative to said base.

8. The timing device of claim 6 including indicia located along a spiral path, an index means for identifying the indicia which indicate the period of said member, and means responsive to rotation of said disc means to move said index means relative to said indicia.

9. The timing device of claim 6 wherein said disc means has indicia affixed thereto in a spiral path, index means movably mounted on said base for identifying the indicia which indicate the period of said member, and means for moving said index means radially as said disc means is rotated.

10. A timing device, comprising: base means; a bidirectional self-starting motor means mounted on said base means which, when constrained from rotation in one direction, will rotate in the opposite direction; a holder rotated about an axis by said motor, a slide with a projecting pin thereon mounted on said holder for movement in a radial direction; disc means movably mounted to said base, having a spiral channel therein, said projecting pin extending into said spiral channel, causing said pin to follow a spiral path about said axis; first stop means located along said path for engaging said pin when rotated thereagainst, causing said motor to stop rotation in the one direction and begin rotation in the opposite direction; and second stop means including an arm having a first and second end portion; means pivotally mounting said first end portion to said base; a member on said second end portion projecting into said spiral channel, causing said second end to follow an arcuate path as said disc means is rotated, thereby moving said second end portion to different points along said spiral surface for engagement with said abutment when rotated thereagainst to cause said motor to stop rotation in the other direction and begin rotation in the one direction.

11. The timing device of claim 10 including a switch means having actuating means associated therewith, means associated with the second end portion of said arm and movable when said pin is rotated thereagainst, and means responsive to said movement for engaging said actuating means, actuating said switch.

12. A timing device, comprising: support means having a front and back base extending therefrom; disc means located between said bases and having a shaft rotatably mounted to said front base, said disc having a channel therein which spirals inward toward a closed end stop surface; a bidirectional self-starting motor means mounted on said back base which, when constrained from rotation in one direction, will rotate in the opposite direction; a holder located adjacent said disc and rotated about an axis by said motor, a slide mounted on said holder for movement in a radial direction and carrying a pin which extends into said spiral channel, causing said pin to follow a spiral path about said axis, the engagement of said pin with said closed end stop causing said motor to stop rotation in the one direction and begin rotation in the opposite direction; an arm having a first and a second end portion; means movably mounting said first end portion to said base; a pin on said second end portion projecting into said spiral channel, the rotation of said disc causing said second end portion to move to different points along said channel, varying the distance between said second end portion and said stop surface; a stop member movably mounted on said arm, having a first stop portion and a second stop portion extending beyond said second end portion; switch means having an actuating portion positioned adjacent said first stop portion, the engagement of said slide pin with said second stop portion moving said first stop portion against said actuating means and causing said motor to stop rotation in the opposite direction and begin rotation in the one direction.

13. A timing device, comprising: support means having a front and a back base extending therefrom; disc means located between said bases and having a shaft rotatably mounted to said front base, said disc having a channel therein which spirals inward toward a closed end stop surface; a bidirectional self-starting motor means which, when constrained from rotation in one direction, will rotate in the opposite direction, said motor means being rotatably mounted to said back base, allowing a portion of said motor means to rotate through a path; means located along said path and affixed to said back base for preventing further rotation of said motor means, including switch means affixed to said back base and having actuating means located along said path for preventing further rotation of said motor means; a holder located adjacent said disc and rotated about an axis by said motor, a slide mounted on said holder for movement in a radial direction and carrying a pin which extends into said spiral channel, causing said pin to follow a spiral path about said axis; an arm having a first stop and a second end portion; means movably mounting said second end portion to said base; a pin on said first stop portion projecting into said spiral channel, the rotation of said disc causing said second end portion to move to different points along said channel, varying the distance between said first stop portion and said stop surface, the engagement of said pin with one of said stops causing said motor to stop rotation in the one direction and begin rotation in the opposite direction, and the engagement of said pin with the other of said stops causing said motor means to rotate into engagement with said actuating means, thereby actuating said switch, and causing said motor means to stop rotation in the opposite direction and begin rotation in the one direction.

14. A timing device, comprising: a bidirectional self-starting motor means having a rotatable shaft which, when constrained from rotation in one direction, will rotate in the opposite direction; means connecting said shaft to a member for rotation thereby; a source of energy for said motor; switch means connecting said source to said motor when closed, causing said shaft to rotate; a pair of stop means for constraining said member when rotated thereagainst to reverse the direction of rotation of said shaft, one of said stops including means for opening said switch means when said member is rotated thereagainst, allowing one cycle of reciprocation of said shaft; and means for bypassing said switch means to start another cycle of reciprocation of said shaft.

15. The timing device of claim 14 including an electrical socket connected across said motor, said socket being energized by said source while said motor is energized.

16. A timing device, comprising: a bidirectional self-starting motor means having a rotatable shaft which, when constrained from rotation in one direction, will rotate in the opposite direction; means connecting said shaft to a member for rotation thereby; a source of energy for said motor, having a first and a second source terminal; means connecting said first source terminal with one of two motor terminals for energizing said motor; a switch having a common terminal connected to said second source terminal, a normally closed terminal connected to the other of said motor terminals for causing said shaft to rotate, and a normally open terminal; a first electrical socket connected across said motor terminals, said first socket being energized while said motor is energized; a second electrical socket connected across said first source terminal and said normally open terminal; a pair of stop means for constraining said member when rotated thereagainst to reverse the direction of rotation of said shaft, one of said stops including means for actuating said switch, connecting said common terminal to said normally open terminal when said member is rotated thereagainst, allowing one cycle of reciprocation of said shaft and energizing said second socket; and means for bypassing said switch to start another cycle of reciprocation of said shaft.

17. A timing device, comprising: a bidirectional self-starting motor means having base means and a shaft rotatable with respect to said base and which when constrained from rotation in one direction will rotate in the opposite direction; a support on which said motor base means is rotatably mounted; and means for constraining said shaft from rotation relative to said support, causing said base means to rotate relative thereto.

18. The timing device of claim 17 including switch means actuated in response to the movement of said base means.

19. A timing device, comprising: a bidirectional self-starting motor means having base means and a shaft rotatable with respect to said base and which when constrained from rotation in one direction will rotate in the opposite direction; a support on which said motor base means is rotatably mounted; means having a member rotated by said motor; means mounted on said support, including stop surfaces located in the path of said rotating member for engagement therewith, the engagement of said member with one of said stop surfaces causing said base means to move to a new position; and means constraining said base means at said new position, causing said shaft to stop rotation in the one direction and begin rotation in the opposite direction, said constraining means including switch means mounted on said support and actuated in response to the movement of said base means.

20. A timing device comprising: a bidirectional self-starting motor means having housing means and a shaft rotatable with respect to said housing and which when constrained from rotation in one direction will rotate in the opposite direction; a support having an aperture therein, said shaft extending through said aperture and being rotatably mounted therein; means having a member rotated by said motor; means mounted on said support, including stop surfaces located in the path of said rotating member for engagement therewith, the engagement of said member with one of said stop surfaces causing said housing means to rotate to a new position; and means constraining said housing means at said new position, causing said shaft to stop rotation in the one direction and begin rotation in the opposite direction, said constraining means including switch means mounted on said support and actuated in response to the movement of said housing means.

References Cited

UNITED STATES PATENTS

| 2,398,994 | 4/1946 | Bazley | 200—33 |
| 3,293,385 | 12/1966 | Travaglio | 200—38 E |
| 2,614,187 | 10/1952 | Dorothea | 335—69 |
| 2,712,584 | 7/1955 | Pantages | 338—147 X |
| 2,745,915 | 5/1956 | Pantages | 200—11 |
| 2,888,653 | 5/1959 | Jaffe | 338—147 X |
| 3,119,905 | 1/1964 | Nicolaus | 200—11 |
| 3,185,874 | 5/1965 | Hunt et al. | 200—38 X |

BERNARD A. GILHEANY, *Primary Examiner.*

ROBT. COHRS, *Assistant Examiner.*